(12) United States Patent
Cartes et al.

(10) Patent No.: US 11,582,101 B2
(45) Date of Patent: Feb. 14, 2023

(54) UPDATE OF PROGRAMMABLE FOR COMPUTING NODES

(71) Applicant: Hewlett-Packard Development Company, L.P., Houston, TX (US)

(72) Inventors: Andrew C Cartes, Cypress, TX (US); Andrew Brown, Houston, TX (US); David Kimler Altobelli, Houston, TX (US); Donnie G Wahlquist, Houston, TX (US); Sreenivasakumar Sivasubramanian, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1402 days.

(21) Appl. No.: 14/781,301

(22) PCT Filed: Mar. 29, 2013

(86) PCT No.: PCT/US2013/034663
§ 371 (c)(1),
(2) Date: Sep. 29, 2015

(87) PCT Pub. No.: WO2014/158194
PCT Pub. Date: Oct. 2, 2014

(65) Prior Publication Data
US 2016/0057001 A1   Feb. 25, 2016

(51) Int. Cl.
*H04L 41/08* (2022.01)
*H04L 41/082* (2022.01)
(Continued)

(52) U.S. Cl.
CPC .............. *H04L 41/082* (2013.01); *G06F 8/65* (2013.01); *G06F 11/1433* (2013.01)

(58) Field of Classification Search
CPC .......... G06F 11/1433; G06F 8/65; G06F 8/61; G06F 8/71; G06F 2201/84; G06F 21/50;
(Continued)

(56) References Cited

U.S. PATENT DOCUMENTS 6,678,741 B1   1/2004   Northcutt et al.
6,904,457 B2   6/2005   Goodman
(Continued)

OTHER PUBLICATIONS

Steven Brown, "Software Update Recovery for Wireless Sensor Networks," Article—20 pgs.—NUI Maynooth, Ireland.
(Continued)

*Primary Examiner* — Anh Nguyen
(74) *Attorney, Agent, or Firm* — Rathe Lindenbaum LLP

(57) ABSTRACT

For computing nodes having a first programmable and comprising a first node and a second node, an update of the first node from the first programmable to a second programmable across an external network is initiated. In response to the update being interrupted, the first programmable is automatically reinstated on the first node by retrieving the first programmable from the second node across an internal network. The second node is automatically updated to the second programmable by retrieving the second programmable from the first node across the internal network in response to completion of the update of the first node to the second programmable.

23 Claims, 7 Drawing Sheets

(51) Int. Cl.
G06F 11/14 (2006.01)
G06F 8/65 (2018.01)

(58) Field of Classification Search
CPC ........ G06F 11/2023; G06F 8/60; G06F 16/27; G06F 8/656; H04L 41/082
See application file for complete search history.

(56) References Cited

U.S. PATENT DOCUMENTS

| | | | |
|---|---|---|---|
| 7,200,845 B2 | 4/2007 | Morrison et al. | |
| 7,219,343 B2 | 5/2007 | Almeida et al. | |
| 7,461,374 B1 * | 12/2008 | Balint | G06F 8/658 |
| | | | 717/174 |
| 7,584,466 B1 | 9/2009 | Rao | |
| 7,761,734 B2 * | 7/2010 | Ellsworth | G06F 11/1433 |
| | | | 714/15 |
| 8,495,618 B1 * | 7/2013 | Inbaraj | G06F 8/654 |
| | | | 717/173 |
| 8,677,343 B2 * | 3/2014 | Averbuch | G06F 8/665 |
| | | | 717/171 |
| 8,726,262 B2 * | 5/2014 | Ohama | G06F 8/654 |
| | | | 717/168 |
| 8,782,632 B1 * | 7/2014 | Chigurapati | G06F 8/65 |
| | | | 717/172 |
| 9,146,725 B2 * | 9/2015 | Nolterieke | G06F 8/65 |
| 9,420,065 B2 * | 8/2016 | Mayo | H04L 67/34 |
| 2002/0091807 A1 * | 7/2002 | Goodman | G06F 8/65 |
| | | | 709/221 |
| 2007/0169075 A1 * | 7/2007 | Lill | G06F 8/61 |
| | | | 717/168 |
| 2008/0184020 A1 | 7/2008 | Gee et al. | |
| 2008/0256525 A1 * | 10/2008 | Ellsworth | G06F 8/60 |
| | | | 717/168 |
| 2011/0047538 A1 | 2/2011 | Chung et al. | |
| 2011/0106886 A1 * | 5/2011 | Nolterieke | G06F 8/65 |
| | | | 709/204 |
| 2011/0179406 A1 * | 7/2011 | Ohama | G06F 8/654 |
| | | | 717/168 |
| 2011/0191764 A1 | 8/2011 | Piorecki | |
| 2012/0102478 A1 | 4/2012 | Jeong | |
| 2012/0110562 A1 | 5/2012 | Heinrich et al. | |
| 2013/0074061 A1 * | 3/2013 | Averbuch | G06F 8/665 |
| | | | 717/171 |
| 2014/0207844 A1 * | 7/2014 | Mayo | H04L 67/34 |
| | | | 709/203 |
| 2014/0282486 A1 * | 9/2014 | Hisamoto | G06F 8/65 |
| | | | 717/173 |

OTHER PUBLICATIONS

PCT/ISA/KR, International Search Report, dated Dec. 18, 2013, PCT/US2013/034663, 9 pps.

* cited by examiner

UPDATE OF PROGRAMMABLE FOR COMPUTING NODES

BACKGROUND

Some computing systems may employ multiple independent processors that independently operate using a programmable. Updating the programmable used by each of the independent processors is subject to corrupt updates and unintended interruptions. Such corrupt updates or unintended interruptions may result in one or more of the processors being disabled until a technician initiated recovery is completed.

DETAILED DESCRIPTION OF THE EXAMPLE EMBODIMENTS

Figure 1:
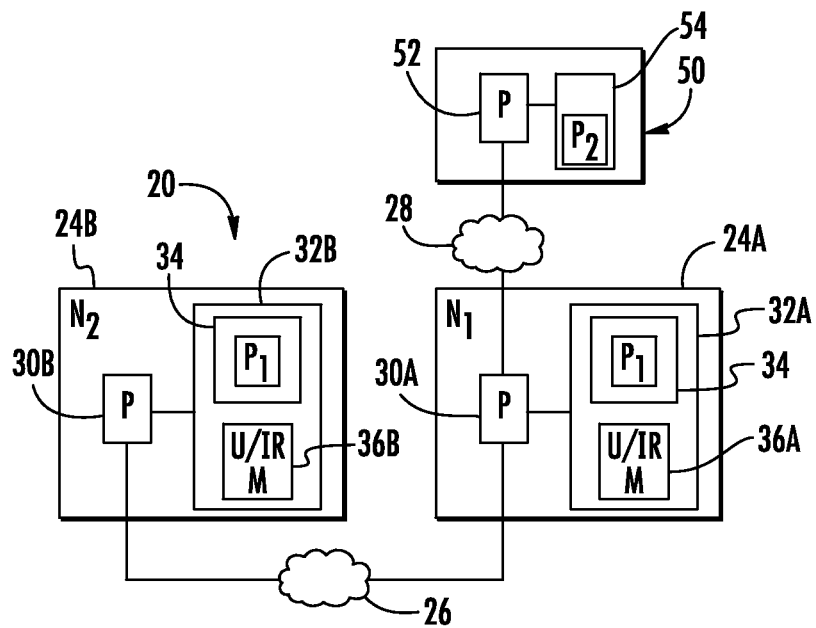
FIG. 1 is a schematic illustration of an example computing node update system.

FIG. 1 schematically illustrates an example computing node update system 20. Computing node update system 20 employs multiple independently operating processors that operate according to one or more programmables. As will be described hereafter, computer node update system 20 facilitates the updating of the multiple nodes to different programmables. Upon encountering update interruptions, computer node update system 20 facilitates automatic recovery with less or without user intervention, without external networking, and without component replacement.

Computing node update system 20 comprises a plurality of computing nodes 24A, 24B (collectively referred to as computing nodes 24). Computing nodes 24 are interconnected or are in communication with one another across an internal communication network 26. At least one of nodes 24 is in further communication with an external communication network 28. For purposes of this disclosure, the term "external network" refers to a communication network or computer network that supports connectivity of nodes 24 to equipment outside of the chassis or rack containing, supporting or housing multiple computing devices that are associated with nodes 24. For example, a chassis or rack may contain multiple computing devices, such as servers, which are managed by nodes 24. An "external network" refers to a communication network and its components that facilitate communication of such nodes 24 to other users or other computing devices external to the chassis or rack. An external network includes network hubs and switches, clients and service protocols that facilitate such external communication. For purposes of this disclosure, the term "internal network" refers to a communication network or computer network (switches) that interconnects nodes 24 and other computing devices within the particular chassis or rack. For example, an internal network interconnects the nodes 24 and the computing devices contained or housed within the same chassis. An internal network does not support end-user connectivity. Although node 24A is illustrated as being in communication with an external network 28, in other implementations, both of nodes 24 may be in communication with the external network 28.

Computing nodes 24A, 24B comprise processing units 30A, 30B (collectively referred to as processing unit 30) and memories 32A, 32B, respectively. Processing units 30 each comprise one or more processing units to carry out one or more functions. In one implementation, each processing unit 30 carries out one or more management operations or functions for a set of servers, cartridges and the like. In one implementation, processing units 30 of nodes 24 collectively cooperate to manage a group of servers, wherein each node 24A, 24B carries out a distinct portion of the overall set our group of management tasks for the group of servers. In other implementations, each processor unit 30 carries out other management or computing operations.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, one or more of nodes 24 may be at least partially embodied as part of one or more application-specific integrated circuits (ASICs). Unless otherwise specifically noted, each of nodes 24 is not limited to any specific combination of hardware circuitry and software, nor to any particular source for the instructions executed by the processing unit.

Memories 32 of nodes 24 each comprises a non-transient computer-readable medium containing code or other computer-readable programs or instructions for directing the associated processor 30A, 30B of the particular node 24. In the example illustrated, memory 32A, 32B comprises programmable storage portions 34A, 34B (collectively referred to as programmable storage portion 34 and update and interruption recovery modules 36A, 36B (collectively referred to as update and interruption recovery modules 36), respectively. Programmable storage portions 34 comprise portions of memories 32 storing the one or more programmable directing or utilized by processors 30 in carrying out one or more computing operations. For purposes of this disclosure, the term "programmable" means those instructions or data/parameters that are used by processor 30A, 30B to carry out one or more operations. A "programmable" comprises firmware, programming instructions, parameters and settings. A "programmable" may be provided as a flash image, a data file, programming code, programmable data, and the like. A "programmable" may have different or distinct portions, each portion directing the operation of a designated one of nodes 24, wherein the different portions cooperate in the direction of the multiple nodes 24.

In the example illustrated, programmable storage portions 34 are each illustrated as currently containing the same one or more programmables P1 for use by the associated processor 30. Although each of nodes 24 includes or operates according to the same programmable P1, the programmable P1, in some implementations, may direct the particular associated processor 30 to carry out different operations or functions, such as in implementations where nodes 24 are each dedicated to different sets of management tasks. In one implementation, a single programmable may include portions (programming instructions, settings, parameters, data or the like), each portion designated for a different one of nodes 24.

Figure 2:
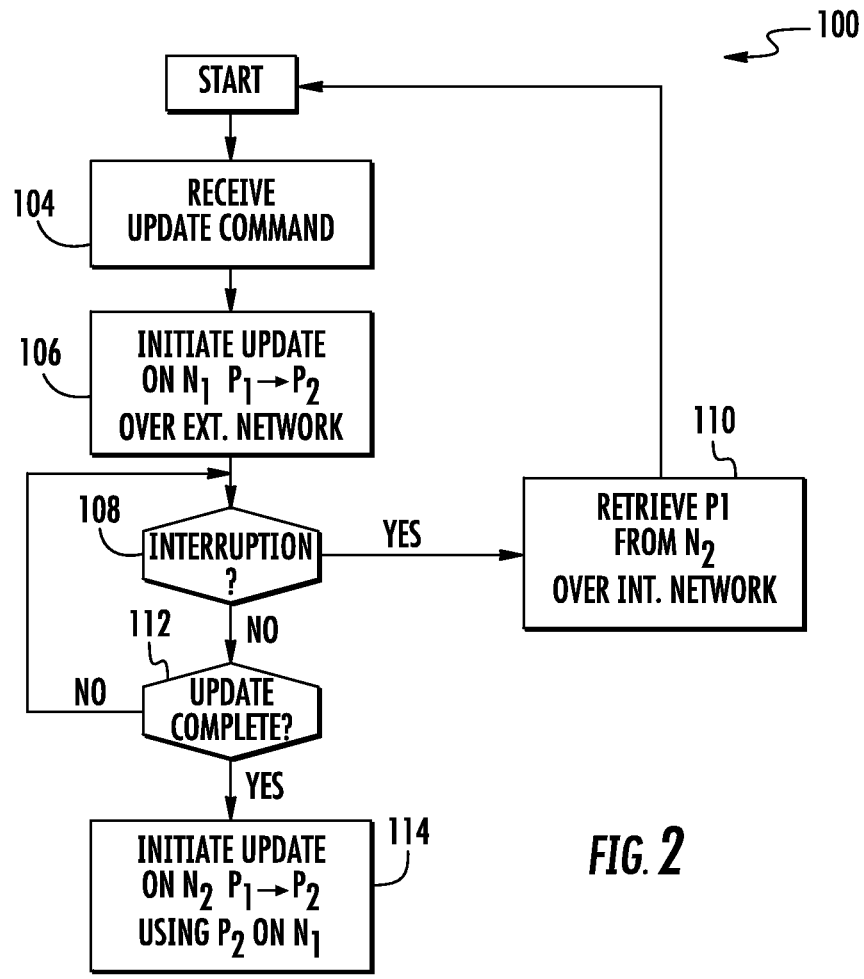
FIG. 2 is a flow diagram of an example method that may be carried out by the computing node update system of FIG. 1.

Update and interruption recovery modules 36 of nodes 24 comprises program instructions for directing the associated processor 30 in the update of one or more programmable stored in programmable storage portion 34. In addition, each module 36A, 36B is further configured to direct the processor in the occurrence of a corrupt or interrupted update. FIG. 2 is a flow diagram illustrating an example 100 method for updating system 20 that may be carried out by modules 36. As indicated by step 104, method 100 is started upon receipt of an update command. In one implementation, the update command is input by a user or received from an administrator. In the example illustrated, the update command is to update the programmables P1 on each of nodes 24 to a different programmable P2 supplied from a source 50 (shown in FIG. 1) across the external network 28. In the example illustrated, the source 50 comprises an administrator having a processor 52 and a memory 54 storing the update programmable P2. In the example illustrated, the external network comprises a wide area network (the Internet) or a local area network.

As indicated by step 106, the update interruption recovery module 36 on node 24A initiates the update on node 24A from programmable P1 to programmable P2 by obtaining the programmable P2 from source 50 over external network 28. In one implementation, each of the modules 36 on each of the nodes 24 includes a setting indicating which of nodes 24 is designated as the "primary node", the node to be initially updated with a new programmable prior to the other "secondary" nodes 24. In the example illustrated, nodes 24 are updated according to a predefined designated order. In such implementations, the node 24 that is updated first according to the designated order may comprise instructions that are different from the instructions of update interruption recovery modules of the other nodes 24. In the example illustrated in which node 24A is designated to receive the update prior to the other nodes 24, module 36A directs the associated processor 30 of node 24A to carry out steps 106-112 while module 36B of node 24B (and any additionally unillustrated nodes 24 of system 20) directs its associated processor to carry out step 114. In another implementation, the update command in step 104 may designate which of the nodes 24 is to initially be updated prior to the other nodes 24. In such an implementation, each of modules 36 may have instructions to carry out steps 106-112 depending upon the input update order.

As indicated by steps 108 and 110, during the initial update of the programmable, module 36A monitors update progress to determine if an interruption has occurred or when the update has been completed or finished. Examples of interruptions that may occur during an update include, but are not limited to, corruption as a result of the removal of a pluggable device for troubleshooting or maintenance purposes, a corruption/interruption occurring as the result of power cycling within system 20, or a power loss during the update. As indicated by step 110, upon identifying the occurrence of an interruption, module 36A automatically directs processor 30A to retrieve the former programmable P1 from one of the other nodes such as node 24B across the internal network 26. As a result, node 24A is not rendered inoperable and is not disabled while waiting for an update command to be once again supplied to reinitiate another attempt at updating node 24A to programmable P2. Rather, programmable P1 is automatically recovered and node 24A is automatically returned to an operative state wherein processor 30 operates using the former programmable P1. Such recovery occurs without user intervention, without an external networking requirement (external network 28 is not utilized during such recovery) and without component replacement. Each of the nodes 24 automatically rendezvous at uniform or consistent programmables across a series of nodes 24.

As indicated by step 114, if the update of the first node 24A from programmable P1 to P2 is successfully completed, other nodes of system 20 are updated with the programmable P2 now contained in programmable storage portion 34 of the first node 24A. In the example illustrated, the update of node 24B from programmable P1 to programmable P2 is initiated using the update programmable P2 on node 24A which is transmitted to node 24B across the internal network 26. As a result, the update of the other nodes of system 20 does not utilize external network 28. In contrast to use of an external network, use of an internal network provides a priori known configuration and behavior as well as a guaranteed resource. In other implementations, the updates may be implemented across a single external network such as a local area network. Once the updates are complete, one of more additional steps may be performed to initiate or engage the updated changes. For example, system 20 may reload, reset or await an event, command, or signal to operate with the updated changes.

Figure 3:
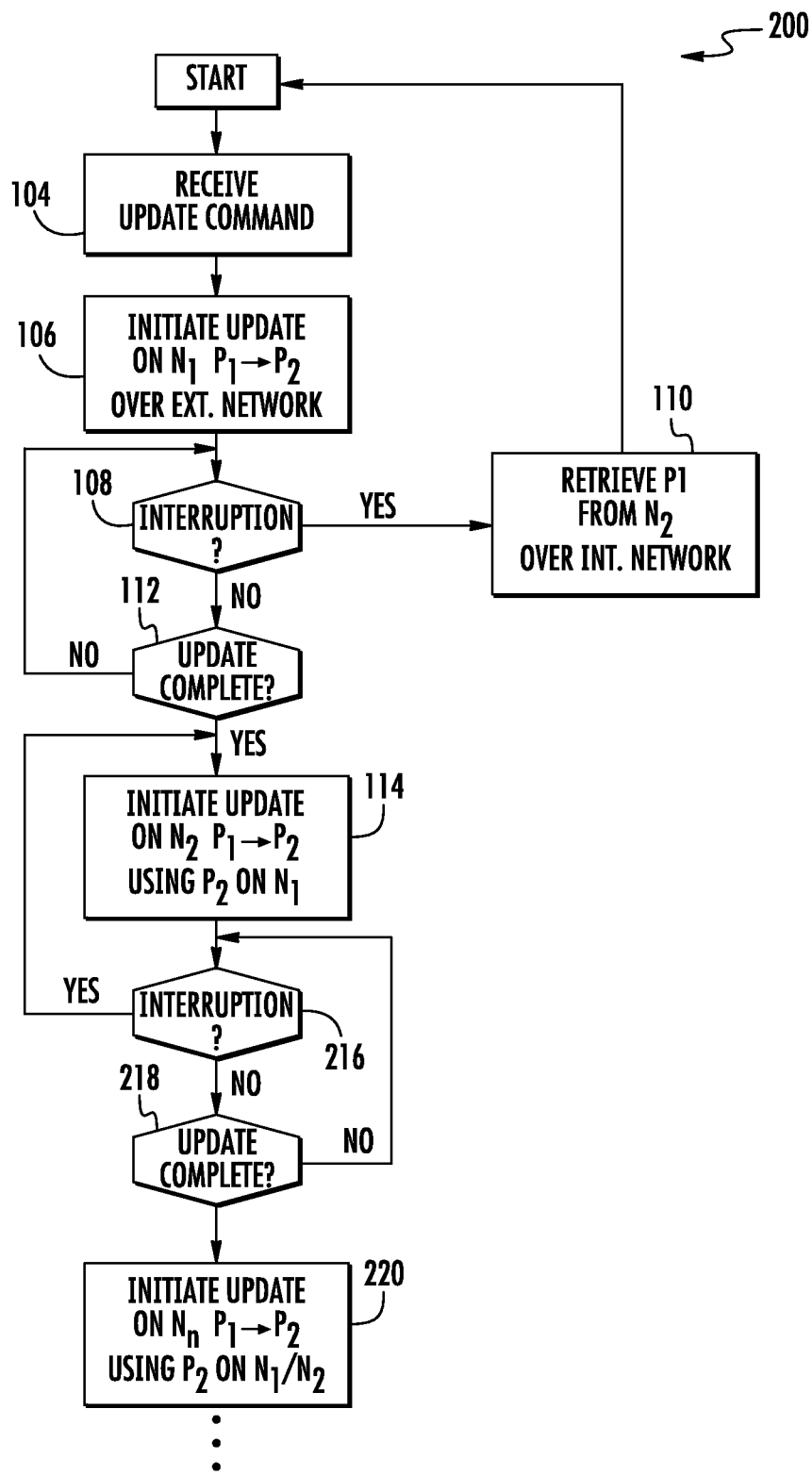
FIG. 3 is a flow diagram of another example method that may be carried out by the computing node update system of FIG. 1.

FIG. 3 is a flow diagram illustrating method 200, another example method for updating system 20 that may be carried out by modules 36. Method 200 is similar to method 100 except the method 200 explicitly includes additional steps for recovering from interruptions that occurred during the update of the secondary nodes 24 after an update of the primary node 24 is been completed. Those remaining steps of method 200 which correspond to steps of method 100 are numbered similarly.

As indicated by steps 216 and 218, once the update of the secondary node 24B has been initiated in step 114, module 36B monitors for the occurrence of an interruption or completion of the update of node 24B. If an interruption is identified, module 36B automatically re-initiates the updating of node 24B by once again retrieving the updated programmable P2 from the primary node 24A across the internal network 26. Alternatively, module 36B automatically reinitiates the updating of node 24B by once again retrieving the updated programmable P2 from other of nodes 24 and system 20 that have already completed an update. As indicated by step 220, upon determining that the update of the secondary node 24B to the updated programmable P2 has been successfully completed, steps 114, 216 and 218 are repeated for each of the other nodes 24 that may be part of system 20. In such an instance, the updated programmable P2 on the secondary node 24B may also be utilized in the update of such other secondary nodes 24.

Although steps 114, 216, 218 and 220 are described with respect to it one implementation wherein the one or more secondary nodes 24B are sequentially or serially updated, in other implementations, steps 114, 216 and 218 may be carried out in parallel or concurrently on multiple secondary nodes 24B. In either situation wherein the secondary nodes 24B are updated serially or are updated in parallel, at least one intact image has been established on the primary node 24A, guaranteeing a "fail forward" or "fail back" recovery. Once the updates are complete, one of more additional steps may be performed to initiate or engage the updated changes. For example, system 20 may reload, reset or await an event, commander signal to operate with the updated changes.

Figure 4:
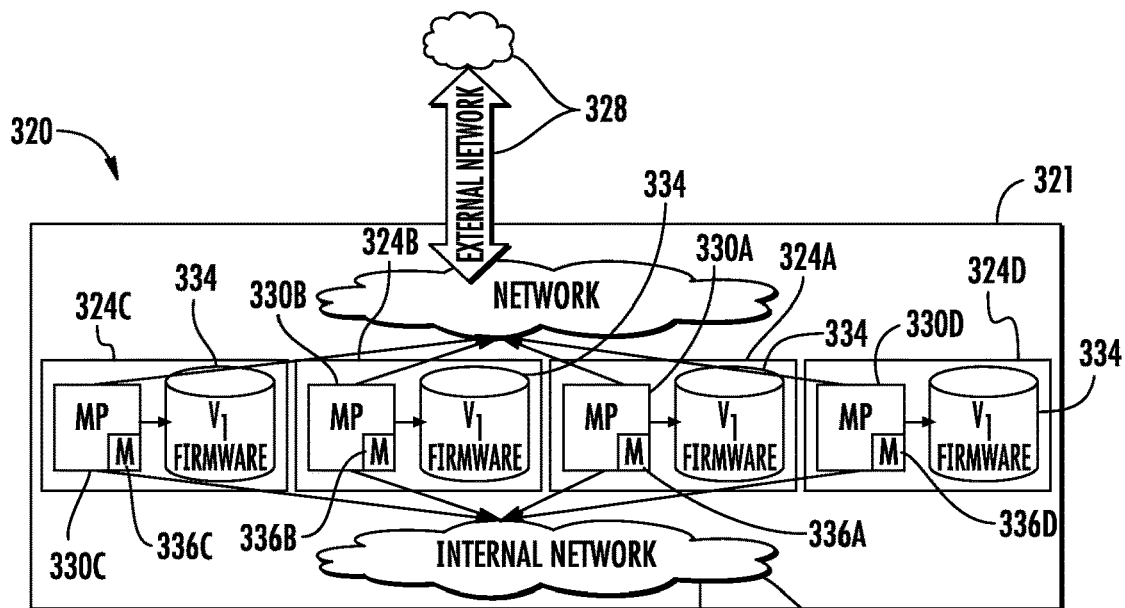
FIG. 4 is a schematic illustration of another example computing node update system managing servers in accordance with a first firmware V1.

FIG. 4 schematically illustrates computing node update system 320, an example implementation of computing node update system 20. As shown by FIG. 4, system 320 comprises manager 321 which manages operations of cartridges or servers 322 forming a rack or chassis 323. Examples of operations or functions of servers 322 that are managed by manager 321 include, but are not limited to, the monitoring control of temperature, on-off status, fault monitoring, indicator monitoring, event monitoring, telemetry acquisition in storage, maintain activity and event logs, remote operation and deployment and the like. In the example illustrated, manager 321 carries out the monitoring or management of servers 322 using multiple computing nodes 324A, 324B, 324C and 324D (collectively referred to as computing nodes 324). Similar to computing nodes 24 of system 20, computing nodes 324A, 324B, 324C and 324D comprise managing processor 330A, 330B, 330C and 330D with an associated update and interruption recovery module 336A, 336B, 336C and 336D, respectively. Each of managing processors 324 is communicatively connected to other nodes 324 across an internal network 326. Each of managing processors 324 is communicatively connected to an external network 328.

Each of nodes 324 further comprises a programmable storage portion 334 for storing programmables for the particular managing processor 330. In the example illustrated, the programmables stored in storage portion 334 comprise firmware flash images. FIG. 4 illustrates system 320 in a state wherein each of nodes 324 is managing servers 322 in accordance with a first version V1 of firmware provided on the firmware flash images.

Figure 5:
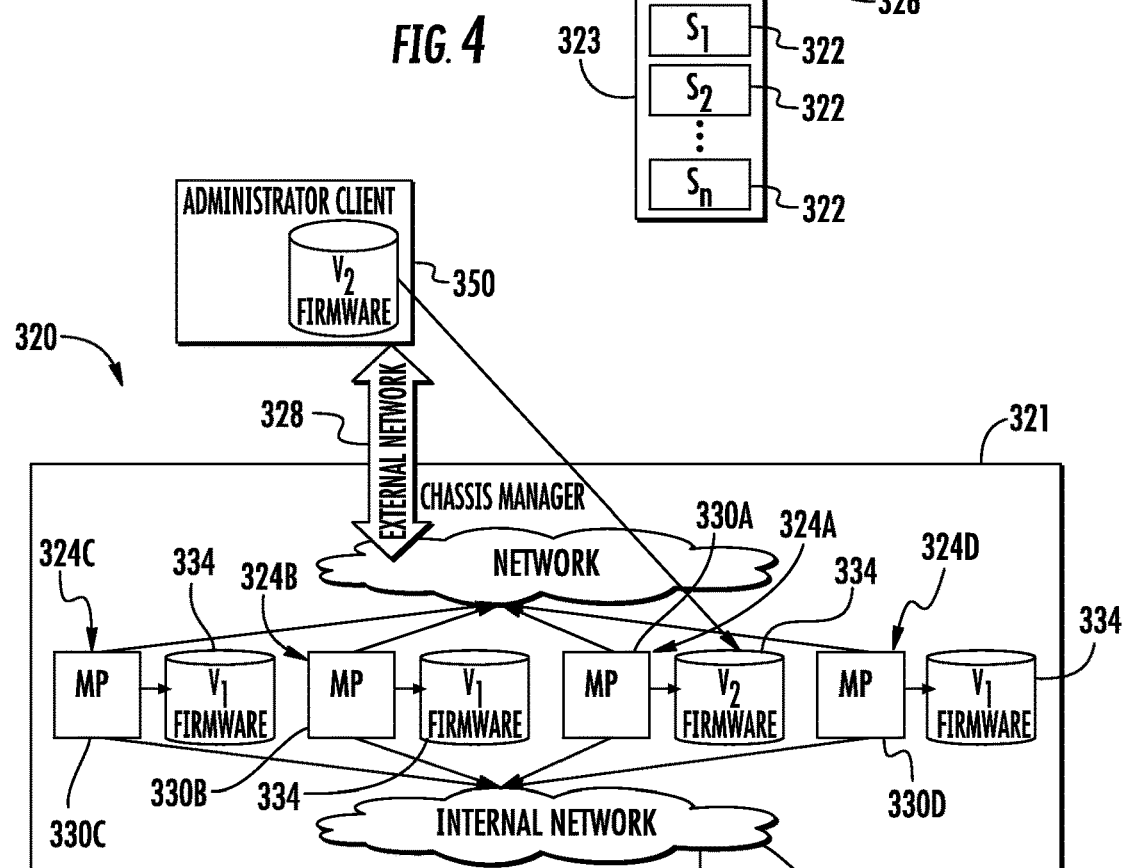
FIG. 5 is a schematic illustration of the computing node update system of FIG. 4 during an attempted update of a primary node to a second firmware V2 across an external network.

FIGS. 5-12 illustrate the updating of computing nodes 324 in accordance with one implementation of method 200 shown in FIG. 3. As shown by FIG. 5, in response to receiving an update command per step 104, the update of programmable firmware V1 is initiated on primary computing node 324A. Management processor 330A, following instructions provided by module 336A, retrieves or otherwise receives the update programmable, version 2 of the programmable, V2 firmware across the external network 328 from source 350. In the example illustrated, the update is through flash programming. As indicated by steps 108 and 112 in FIG. 3, upon initiation of the update, module 336A of the primary node 324A monitors for any interruptions/corruptions or completion of the update.

Figure 6:
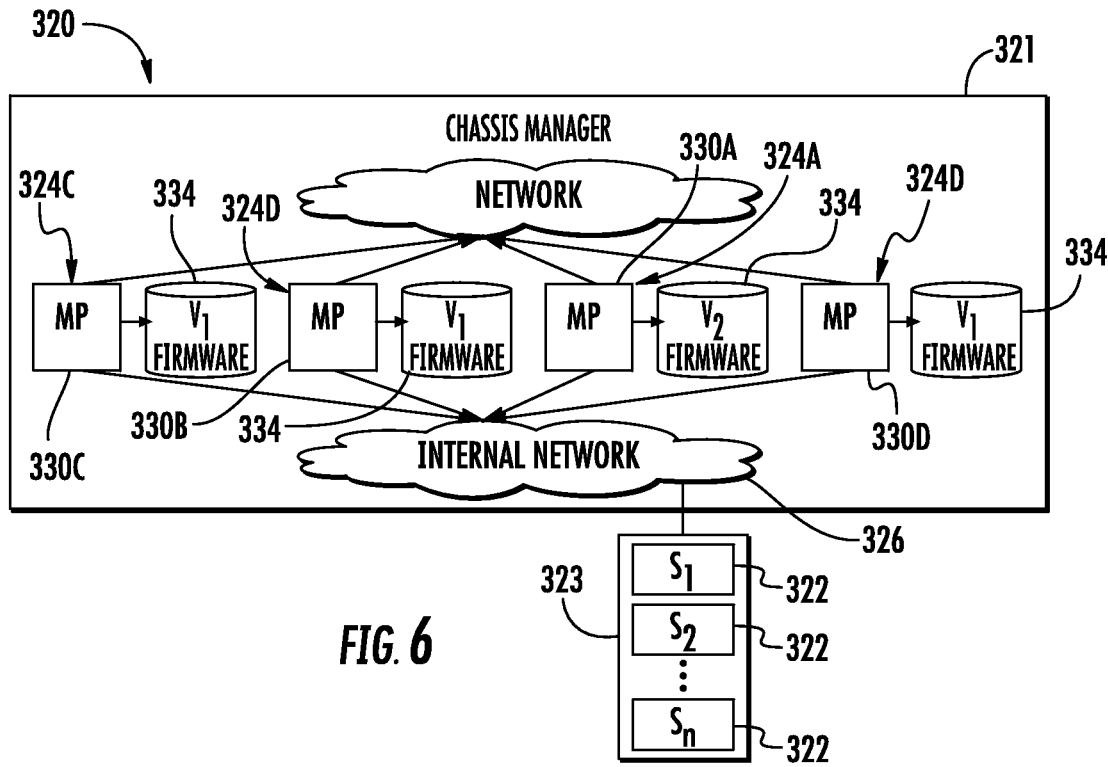
FIG. 6 is a schematic illustration of the computing node update system of FIG. 4 upon the occurrence of an interruption of the update of the primary node.
Figure 7:
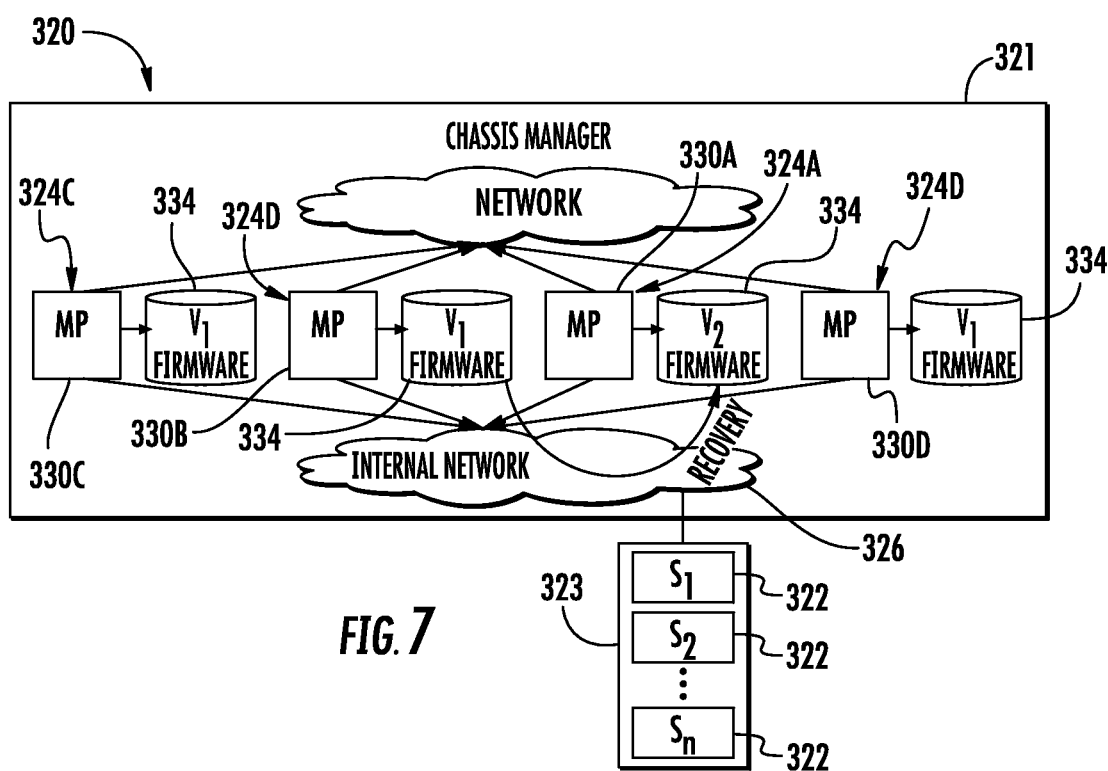
FIG. 7 is a schematic illustration of the computing node update system of FIG. 4 illustrating recovery of the primary node through retrieval of the first firmware V1 from a secondary node across an internal network.

FIG. 6 illustrates system 320 upon the occurrence of an interruption. In the example illustrated, interruption is a result of a failed flash programming. As a result of the corrupt update, the primary node 324A resets, but balks on the invalid or corrupt firmware image. As shown by FIG. 7, in response to the interruption in the corrupt flash programming, module 336A automatically (without user intervention or initiation) initiates recovery. As indicated by step 110 in FIG. 3, module 336A automatically retrieves the former programmable, firmware V1, from a secondary node such as node 324B over the internal network 326. Although FIG. 7 illustrates the primary node 324 automatically retrieving an intact firmware image V1 from secondary node 324B, primary node 324 may alternatively retrieve the intact firmware image V1 from any of the other peer secondary nodes 324C or 324D across the internal network 326.

Figure 8:
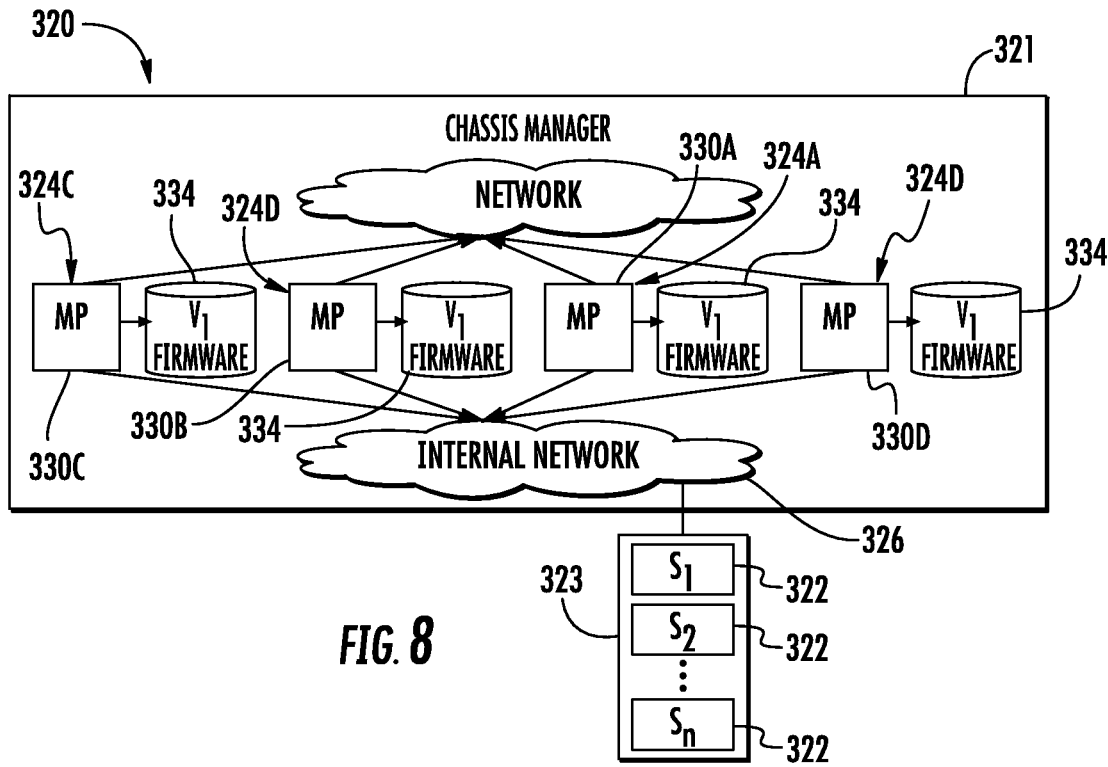
FIG. 8 is a schematic illustration of the computing node update system of FIG. 4 illustrating the nodes once again operating in accordance with the first firmware V1.

As shown by FIG. 8, as a result of the recovery, each of the nodes 324 is running or operating according to the first firmware version V1. Upon such recovery, and as indicated in FIG. 3 with respect to method 200, the update to firmware version V2 may once again be tried. In the example illustrated, the attempt to update the primary node 324A to firmware version V2 occurs after receiving another update command. In another implementation, the attempt to update the primary node 324A to firmware version V2 occurs automatically, without user initiation or intervention. Once again, module 336A monitors the subsequent attempts at updating in steps 108 and 112, wherein subsequent interruptions result in subsequent retrievals per step 110 and wherein completion of the update results in the process moving on to step 114.

Figure 9:
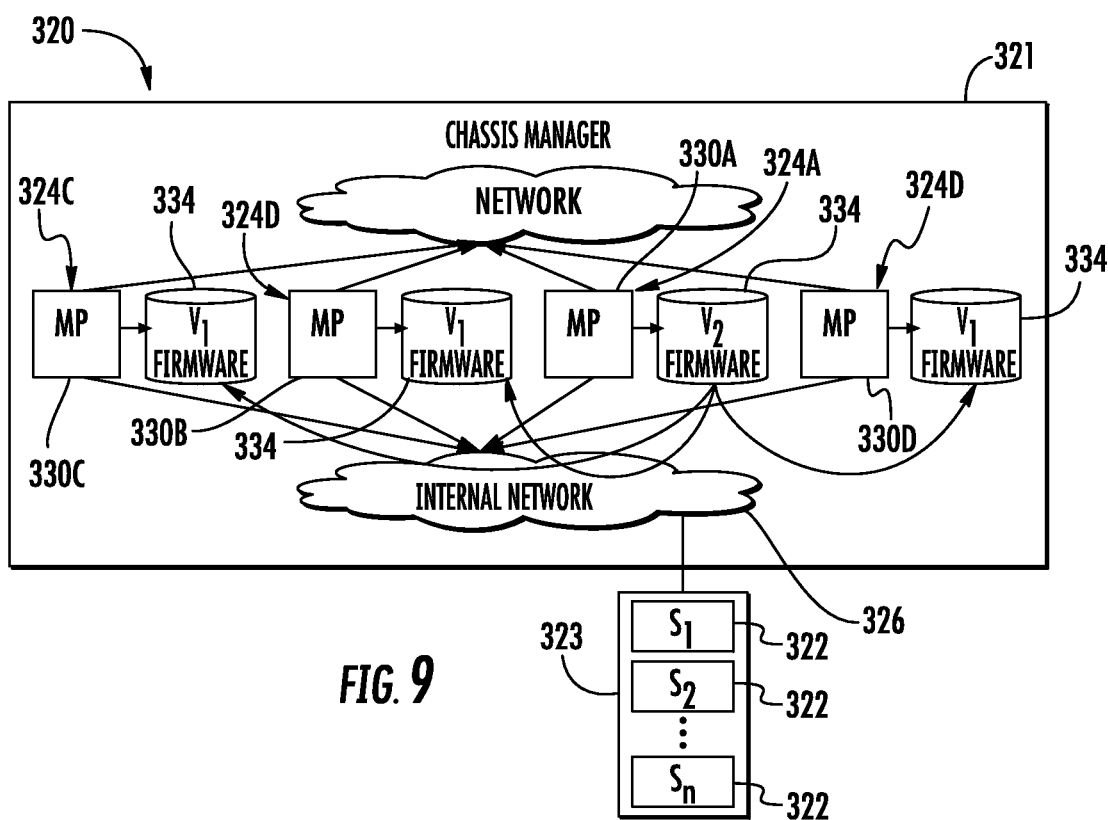
FIG. 9 is a schematic illustration of the computing node update system of FIG. 4 illustrating a completed update of the primary node to the second firmware V2 and the initiation of an update of the secondary nodes by transmitting the second firmware V2 from the primary node across the internal network.

As indicated by step 114 of FIG. 3 and as shown by FIG. 9, upon completion of the update of the primary node 324A to firmware version V2, an update of one or more of the other secondary nodes 324B, 324C and 324D from firmware version V1 to firmware version V2 is automatically (without user initiation or intervention) initiated by transmitting the firmware version V2 from the primary node 324A to the secondary nodes 324 being updated across the internal network 326. In the example illustrated, each of the other secondary nodes 324 are concurrently updated. In another implementation, the secondary nodes 324 may be sequentially updated. As indicated by steps 216 and 218 of the method 200 shown in FIG. 3, the modules 336 of the secondary nodes 324 monitor the progress of the updates on their associated nodes 324.

Figure 10:
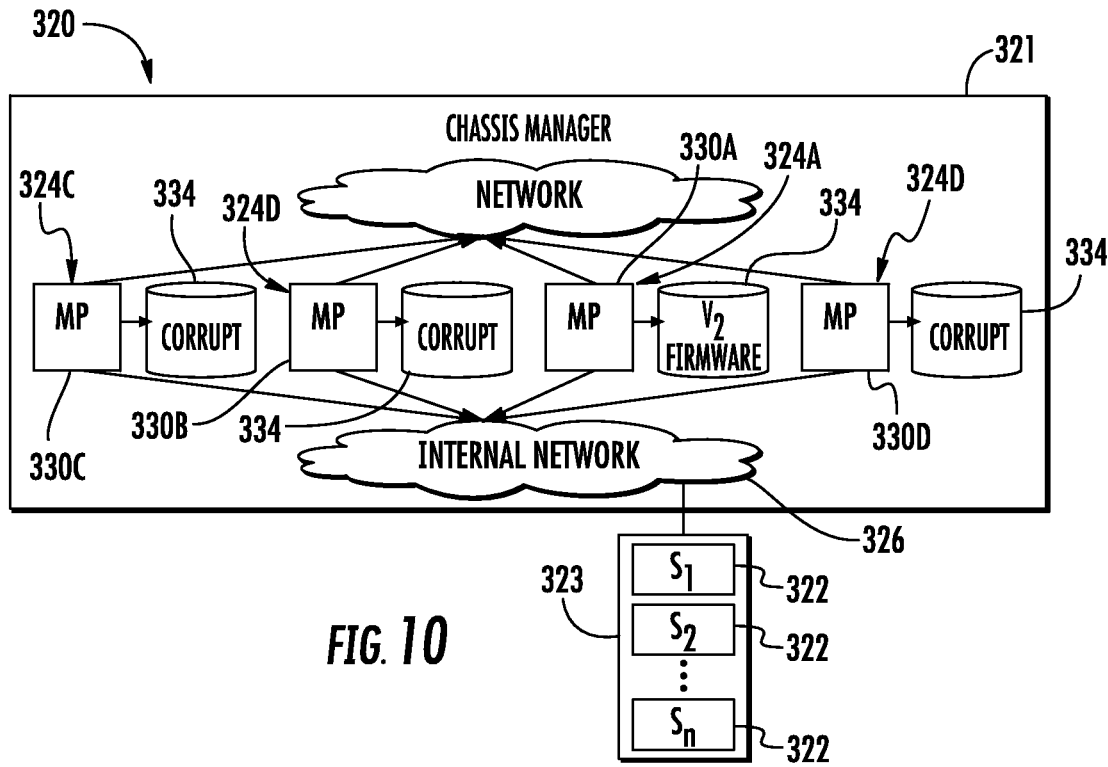
FIG. 10 is a schematic illustration of the computing node update system of FIG. 4 upon occurrence of an interruption or corruption to the updates of the secondary nodes.
Figure 11:
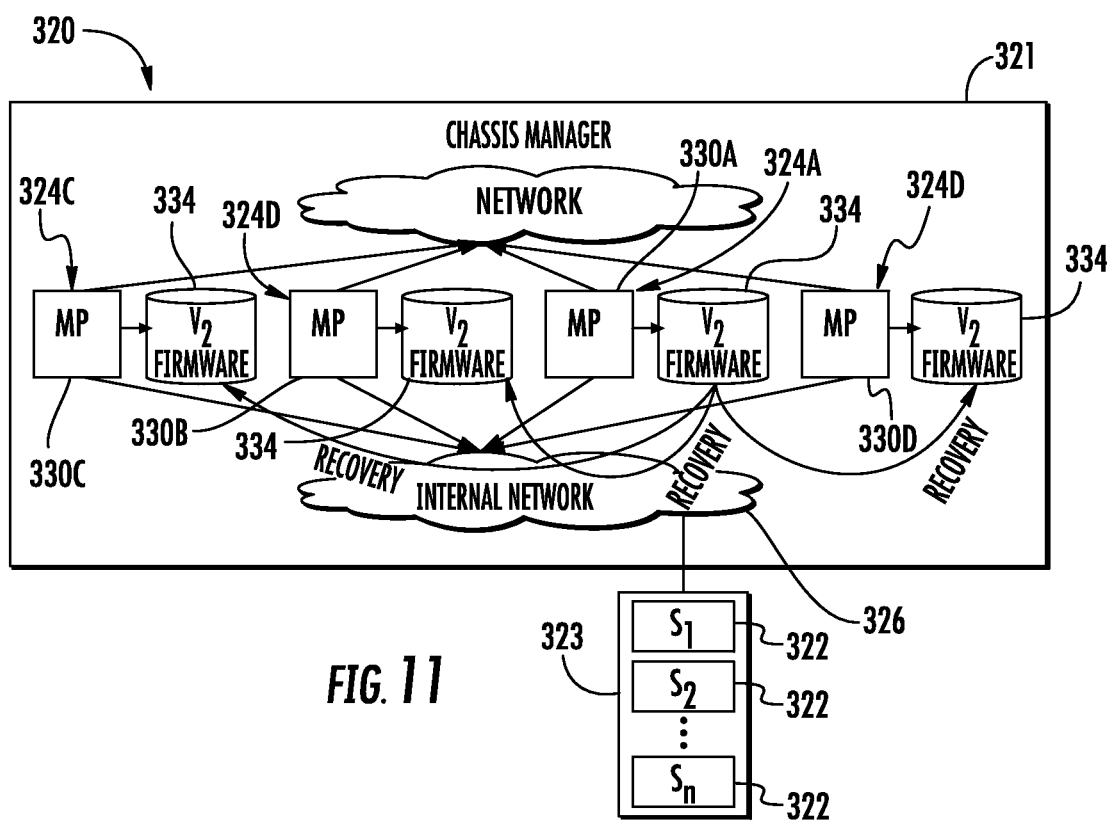
FIG. 11 is a schematic illustration of the computing node update system of FIG. 4 illustrating recovery of the secondary nodes through retrieval of the second firmware V2 from the primary node across an internal network.

FIG. 10 illustrates an instance where the update of one or more of the secondary nodes 324 experiences an interruption or corruption. In the example illustrated, each of the secondary nodes 324 are illustrated as having a corrupt update. In accord with step 216 in FIG. 3, upon occurrence of an interruption/corruption, each of the secondary nodes 324 resets and a recovery process is automatically initiated. In particular, the module 336 of each of the secondary nodes 324 having the corrupt update automatically retrieves or recovers the update firmware V2 once again from the primary node 324A across the internal network 326. In implementations where the secondary nodes 324 are sequentially updated per step 220, recovery of the update firmware V2 may be from any of the other nodes that have completed the update.

Figure 12:
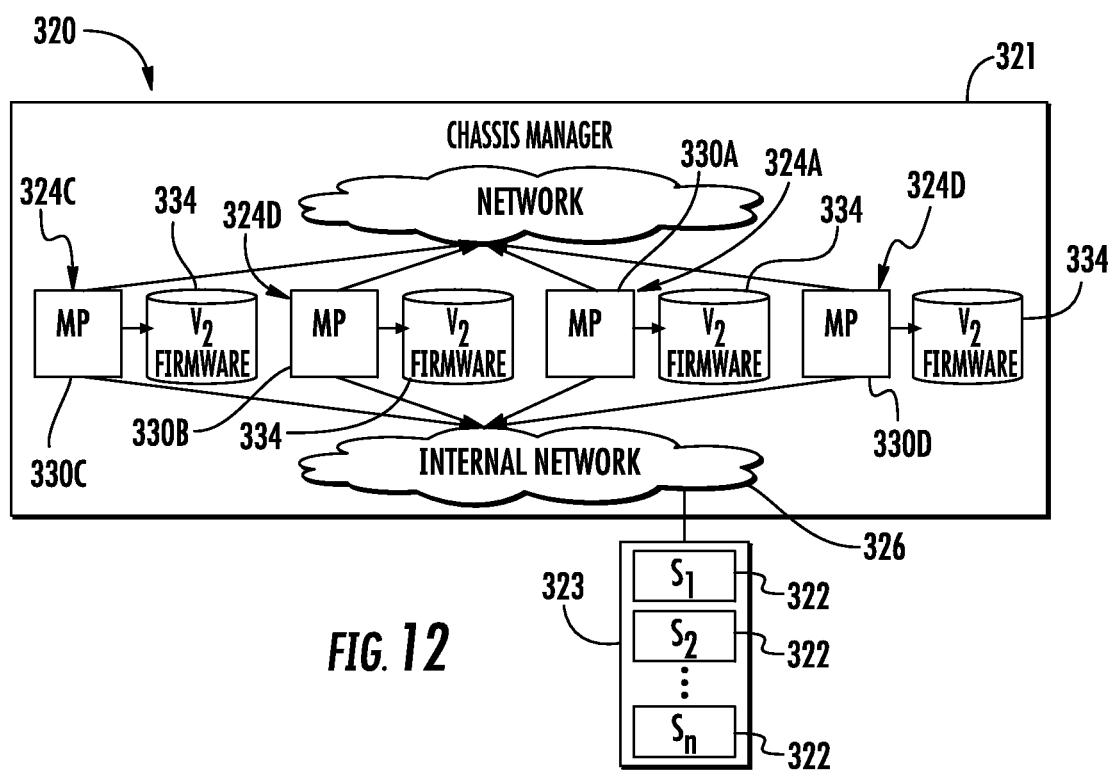
FIG. 12 is a schematic illustration of the computing node update system of FIG. 4 illustrating each of the nodes managing servers in accordance with the second firmware V2.

As shown by FIG. 12, upon completion of method 200, each of the nodes 324 of manager 321 rendezvous at the same updated programmable, firmware V2. Any encountered interruptions are corruptions during any of the update is addressed without prolonged periods during which manager 321 is disabled and with reduced utilization of external network 328. Recoveries from corruption or interruption occur without user intervention, without an external networking requirement (external network 28 is not utilized during such recovery) and without component replacement. Once the updates are complete, one of more additional steps may be performed to initiate or engage the updated changes. For example, system 320 may reload, reset or await an event, commander signal to operate with the updated changes.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
for computing nodes having a first programmable, the computing nodes comprising a first node and a second node, initiating an update of the first node from the first programmable to a second programmable across an external network, wherein the second programmable directs an operation of the first node after completion of the update of the first node to the second programmable;
a processor of the first node executing instructions to update the first node from the first programmable to the second programmable, including determining if an interruption has occurred in updating the first node to the second programmable;
automatically reinstating the first programmable on the first node by retrieving the first programmable from the second node across an internal network in response to the determination that the update of the first node to the second programmable has been interrupted;
the first node automatically initiating update of the second node to the second programmable in response to completion of the update of the first node to the second programmable, wherein a processor of the second node executes instructions to update the second node to the second programmable; and in the update of the second node to the second programmable, providing the second programmable to the second node from the first node across the internal network.

2. The method of claim 1 further comprising automatically re-initiating the updating of the second node to the second programmable from the first node across the internal network in response to a prior updating of the second node being interrupted.

3. The method of claim 1, wherein the first programmable comprises first program instructions for a node processing unit and where the second programmable comprises second program instructions for the node processing unit.

4. The method of claim 3, wherein the first program instructions comprise a first flash image of program instructions and the second program instructions comprise a second flash image of program instructions.

5. The method of claim 3, wherein the first processor comprises a first management processor, the first node further comprises a first memory, the second processor comprises a second management processor, and the second node further comprises a second memory.

6. The method of claim 5, wherein the first management processor and the second management processor collectively carry out management functions for a set of servers, the first management processor carrying out a first portion of the management functions for the set of servers following the first program instructions or the second program instructions and the second management processor carrying out a second portion of the management functions different than the first portion of the management functions for the set of servers following the first program instructions or the second program instructions.

7. The method of claim 1, wherein the first programmable that is updated with the second programmable is selected from a group of programmables consisting of:
firmware, certificate path development library/programmatic agreements library CPLD/PAL images, field replaceable unit (FRU) data, parameters, settings, program instructions, and files.

8. An apparatus comprising:
a non-transient computer-readable medium containing computer-readable code to direct a processing unit of a first node to:
initiate an update of the first node from the first programmable to a second programmable across an external network, wherein the second programmable directs an operation of the first node after completion of the update of the first node to the second programmable;
determine if an interruption has occurred in updating the first node to the second programmable;
automatically reinstate the first programmable on the first node by retrieving the first programmable from a second node across an internal network in response to the determination that the update of the first node to the second programmable was interrupted;
cause the first node to automatically initiate update of the second node to the second programmable in response to completion of the update of the first node, wherein a processing unit of the second node executes instructions to update the second node to the second programmable; and
in the update of the second node to the second programmable, provide the second programmable from the first node to the second node across the internal network.

9. The apparatus of claim 8, wherein the computer-readable code is configured to direct the processing unit to automatically re-initiate the updating of the second node to the second programmable from the first node across the internal network in response to a prior updating of the second node being interrupted.

10. An apparatus comprising:
computing nodes comprising a first node and a second node, wherein each computing node of the computing nodes connected to one another by an internal network, the first node comprising a first processor and a first memory storing first program instructions, and the second node comprising a second processor and a second memory storing second instructions;
wherein the first instructions, when executed by the first processor, cause the first processor to:
 initiate an update of the first node from a first programmable to a second programmable across an external network, wherein the second programmable directs an operation of the first node after completion of the update of the first node to the second programmable;
 update the first node from the first programmable to the second programmable, including determining if an interruption has occurred in updating the first node to the second programmable;
 automatically reinstate the first programmable on the first node by retrieving the first programmable from the second node across the internal network in response to the determination that the update of the first node to the second programmable was interrupted;
 automatically initiate update of the second node to the second programmable in response to completion of the update of the first node to the second programmable; and
 in the update of the second node to the second programmable, provide the second programmable from the first node across the internal network; and
wherein the second instructions, when executed by the second processor, cause the second processor to update the second node to the second programmable.

11. The apparatus of claim 10, wherein the first instructions, when executed by the first processor, further cause the first processor to re-initiate the updating of the second node to the second programmable from the first node across the internal network in response to a prior updating of the second node being interrupted.

12. The apparatus of claim 10 further comprising servers, wherein the computing nodes are configured to manage operation of the servers using either the first programmable or the second programmable.

13. The apparatus of claim 12, wherein the first programmable comprises a first firmware and wherein the second programmable comprises a second firmware.

14. The apparatus of claim 12, wherein the first processor comprises a first management processor and wherein the second processor comprises a second management processor, wherein the first management processor and the second management processor collectively carry out management functions for the servers, the first management processor carrying out a first portion of the management functions for the set of servers following the first programmable or the second programmable and the second management processor carrying out a second portion of the management functions different than the first portion of the management functions for the set of servers following the first programmable or the second programmable.

15. The apparatus of claim 10, wherein the first programmable that is updated with the second programmable is selected from a group of programmables consisting of: firmware, certificate path development library/programmatic agreements library CPLD/PAL images, field replaceable unit (FRU) data, libraries/dynamic link libraries (DLLs), executable-linkable files (ELF), digital certificates and chain of trust information, asset information, operating system components and drivers, scripts and applets, parameters, settings, program instructions, and files.

16. The apparatus of claim 10, wherein each computing node of the computing nodes is updated according to a predefined designated order.

17. The apparatus of claim 10, wherein each computing node of the computing nodes is updated sequentially.

18. The apparatus of claim 10, wherein the first instructions, when executed by the first processor, further cause the first processor to re-initiate update of the second node to the second programmable in response to the update of the second node being interrupted.

19. The apparatus of claim 10, wherein the computing nodes comprise a plurality of secondary nodes, and the secondary nodes of the plurality of secondary nodes are updated from the first programmable to a second programmable concurrently.

20. The apparatus of claim 19, wherein the first programmable is reinstated on the first node by retrieving the first programmable from a secondary node of the plurality of secondary nodes across the internal network in response to the update being interrupted.

21. The method of claim 1, wherein determining if the interruption has occurred comprises monitoring for an occurrence of a removal of a pluggable device, a power cycling or a power loss.

22. The method of claim 1, wherein determining if the interruption has occurred comprises monitoring for a failed programming of a non-volatile memory.

23. The method of claim 1, wherein determining if the interruption has occurred comprises monitoring an ongoing progress of the updating of the first node to the second programmable.

* * * * *